United States Patent
Liu et al.

(10) Patent No.: US 9,557,507 B2
(45) Date of Patent: Jan. 31, 2017

(54) DEVICE FOR FIXING WIRES

(71) Applicant: ADC Telecommunications (Shanghai) Distribution Co., Ltd., Shanghai (CN)

(72) Inventors: Yan Liu, Shanghai (CN); Liming Wang, Shanghai (CN); Li Wang, Shanghai (CN)

(73) Assignee: ADC Telecommunications (Shanghai) Distribution Co., Ltd., Shanghai (CN)

( * ) Notice: Subject to any disclaimer, the term of this patent is extended or adjusted under 35 U.S.C. 154(b) by 0 days.

(21) Appl. No.: 14/818,661

(22) Filed: Aug. 5, 2015

(65) Prior Publication Data

US 2016/0033735 A1 Feb. 4, 2016

Related U.S. Application Data

(63) Continuation of application No. PCT/IB2014/058595, filed on Jan. 28, 2014.

(30) Foreign Application Priority Data

Feb. 8, 2013 (CN) .......................... 2013 1 0051797

(51) Int. Cl.
*G02B 6/44* (2006.01)
*G02B 6/00* (2006.01)
*H02G 15/013* (2006.01)

(52) U.S. Cl.
CPC ........... *G02B 6/4471* (2013.01); *G02B 6/4444* (2013.01); *G02B 6/4451* (2013.01); *H02G 15/013* (2013.01)

(58) Field of Classification Search
CPC ..... G02B 6/4248; G02B 6/4228; G02B 6/444; G02B 6/4444; G02B 6/4451; G02B 6/4471; H02G 15/013
USPC ......... 385/134–139; 174/135, 151, 650, 652, 174/653, 655, 659
See application file for complete search history.

(56) References Cited

U.S. PATENT DOCUMENTS

| | | | |
|---|---|---|---|
| 7,600,721 B2 * | 10/2009 | Vermeer | H02G 1/14 140/123 |
| 2004/0144555 A1 * | 7/2004 | Buekers | G02B 6/4444 174/653 |
| 2006/0285810 A1 | 12/2006 | Vanhentenrijk et al. | |
| 2012/0235363 A1 | 9/2012 | Vanhentwnrijk et al. | |
| 2013/0028568 A1 | 1/2013 | Beamon et al. | |

OTHER PUBLICATIONS

PCT Internationtal Search Report, International Application No. PCT/IB2014/058595, dated Apr. 15, 2014, 5 pages.

* cited by examiner

*Primary Examiner* — Akm Enayet Ullah
*Assistant Examiner* — Michael Mooney
(74) *Attorney, Agent, or Firm* — Merchant & Gould P.C.

(57) ABSTRACT

A device is provided and includes a first catch plate and a retention ring. The first catch plate includes a plurality of first catch plate gripping slots spaced apart from each other and disposed about a circumference thereof. Each of the plurality of first catch plate griping slots include a wire receiving opening extending through a thickness of the first catch plate. The retention ring is removably secured to a periphery of the first catch plate.

10 Claims, 8 Drawing Sheets

DEVICE FOR FIXING WIRES

CROSS-REFERENCE TO RELATED APPLICATION

This application is a continuation of PCT International Patent Application No. PCT/IB2014/058595 filed Jan. 28, 2014, which claims priority under 35 U.S.C. §119 to Chinese Patent Application No. 2013100517973 filed on Feb. 8, 2013.

FIELD OF THE INVENTION

The invention relates to a device for fixing a plurality of wires and, more particularly, to a device for fixing of a plurality of optical fibers.

BACKGROUND

In the process of mounting and sealing air-blown microtubules or fiber tubes within a floor-type optical cable connection box, it is necessary to first pass the casings upwards one by one through a rubber ring. However, since the sponge rubber ring and the fiber tubes are usually soft and the diameter of an opening formed in the sponge rubber ring is often smaller than the diameter of the fiber casing, it is difficult to insert the fiber casing into the opening within the sponge rubber ring. Furthermore, if a plurality of fiber tubes are inserted into or fixed to the sponge rubber ring, a larger resistance has to be overcome when the relative position between the sponge rubber ring and the fiber casing is later adjusted, which makes the adjustment operation difficult.

SUMMARY

The invention has been made to overcome or alleviate at least one aspect of the above mentioned disadvantages, among others. Accordingly, a device is provided and includes a first catch plate and a retention ring. The first catch plate includes a plurality of first catch plate gripping slots spaced apart from each other and disposed about a circumference thereof. Each of the plurality of first catch plate griping slots include a wire receiving opening extending through a thickness of the first catch plate. The retention ring is removably secured to a periphery of the first catch plate.

BRIEF DESCRIPTION OF THE DRAWINGS

The above and other features of the invention will become more apparent by describing in detail exemplary embodiments thereof with reference to the accompanying drawings, in which.

DETAILED DESCRIPTION OF THE EMBODIMENT(S)

Figure 1:
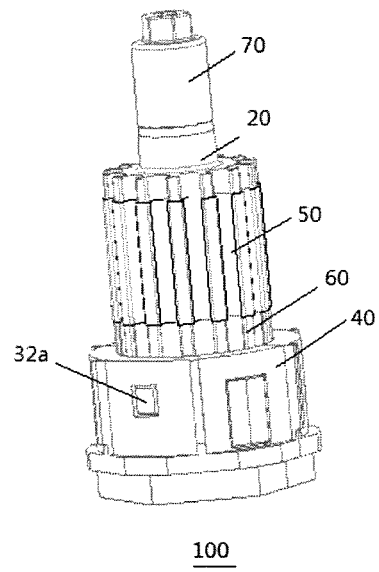
FIG. 1 is a perspective view of a device according to the invention that is for fixing a plurality of wires.

Exemplary embodiments of the invention will be described hereinafter in detail with reference to the attached drawings, wherein the like reference numerals refer to the like elements. The invention may, however, be embodied in many different forms and should not be construed as being limited to the embodiments set forth herein; rather, these embodiments are provided so that the disclosure will be thorough, and will convey the invention to those skilled in the art.

Referring to FIGS. 1-4, the invention relates to a device 100 for simultaneously fixing a plurality of wires 200. The device 100 includes at least one catch plate, for example, an upper catch plate 20 and a lower catch plate 30 to be described later. The catch plate is provided in a circumferential direction thereof with a plurality of catch plate gripping slots, for example, gripping slots 21 and 31 to be described later. The gripping slots are spaced apart from each other, wherein each of the catch plate gripping slots has an opening and extends through the whole thickness of the catch plate so as to receive and pre-locate a wire. The device 100 also includes a retention ring 40 which is removably fixed to a periphery of the catch plate to wrap the plurality of wires 200 pre-located to the catch plate. Each gripping slot may locate the wire by gripping the wire by means of teeth, protrusions or the like, and/or by increasing a force for resisting the wire to enter and leave the slot via an opening of the slot by means of reducing the size of the opening.

The device 100 according to the invention for simultaneously fixing a plurality of wires 200 (for example, referring to FIG. 3) will be described next with reference to the following Figures.

As shown in FIGS. 1-4 and 12, the device 100 includes a shaft 10, an upper catch plate 20, a lower catch plate 30, and a retention ring 40. The shaft 10 defines an axial direction and has an upper end 11 and a lower end 12 (to be more specific, refer to FIG. 7) in the axial direction of the shaft. The upper catch plate 20 is provided with a plurality of first gripping slots 21 arranged in a circumferential direction thereof, each first gripping slot 21 is opened radially outwards (to be more specific, refer to FIG. 8) so as to receive a wire 200. The lower catch plate 30 is provided with a plurality of second gripping slots 31 arranged in a circumferential direction thereof, each second gripping slot 31 is opened radially outwards (to be more specific, refer to FIG. 7) so as to receive the wire 200. Each second gripping slot 31 is in alignment with a corresponding first gripping slot 21 in the axial direction of the shaft (for example, see FIG. 9), wherein the upper and lower catch plates are connected together by the shaft. The retention ring 40 (to be more specific, refer to FIGS. 5-6) removably wraps about a circumference of the lower catch plate 30 or the upper catch plate 20 or other part so as to wrap the wire(s) 200 pre-located by means of the first and second gripping slots 21, 31. The size of each first gripping slot 21 and/or each second gripping slot 31 is reduced at the opening thereof to increase the force for resisting the wire 200 to enter and leave the corresponding gripping slot 21, 31.

With the above solution, the operation of inserting the wire 200 into a through hole is changed into an operation of pressing the wire 200 into a slot along an outer periphery of a holding member, such as the upper and lower catch plates 20, 30 and later fixing the wire 200 by means of the retention ring 40, thus, inserting a plurality of wires 200, especially a plurality of soft wires 200, into a plurality of through holes is avoided. Since the size at the opening of the first gripping slot 21 and/or the second gripping slot 31 is reduced, a wire 200 having a proper outer diameter, for example, a fiber casing, may be gripped in the gripping slot 21, 31, which will facilitate a later fixing operation of the retention ring 40. Please be noted that the reducing of the size at the opening means that the wire may enter the gripping slot 21, 31 through the opening if a proper pressing force is applied radially inwards, and the wire 200 will not move radially outwards to get out of the gripping slot 21, 31 if no external force is applied to it. In the present invention, though the gripping slot 21, 31 is shown as a portion of a substantially cylindrical surface, those skilled in the art may understand that the shape of the gripping slot 21, 31 may be changed based on the shape of the cross section of the wire 200.

Figure 2:
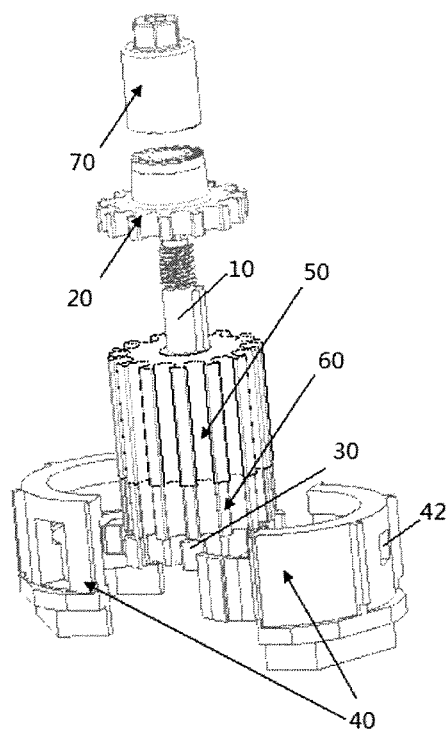
FIG. 2 is an exploded perspective view of the device in FIG. 1.
Figure 3:
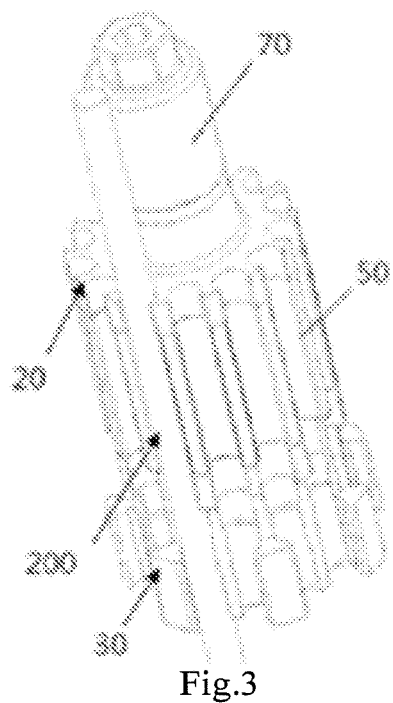
FIG. 3 is a perspective view of a device according to the invention showing a fiber casing gripped in a gripping slot of the device.
Figure 4:
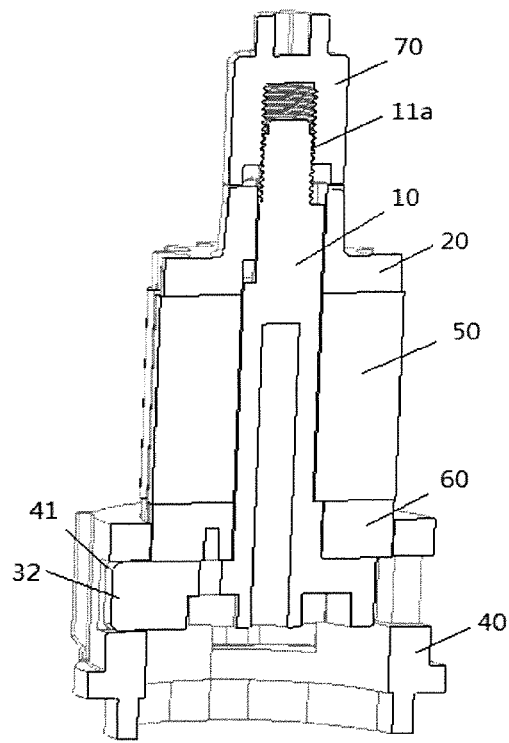
FIG. 4 is a sectional perspective view of the device in FIG. 1.
Figure 9:
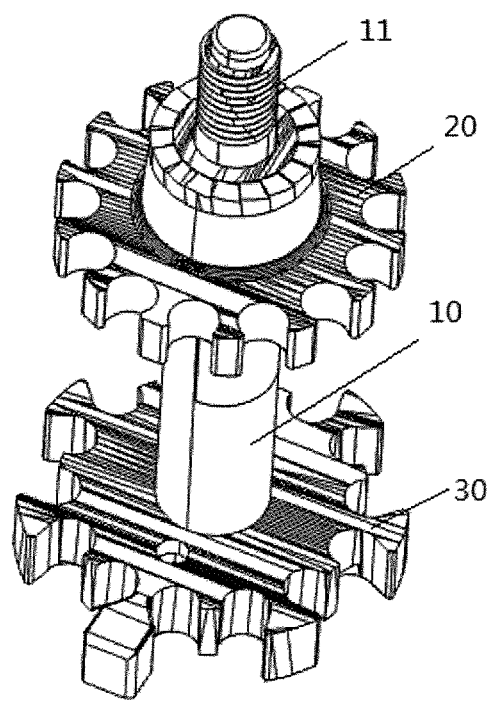
FIG. 9 is a perspective view showing a shaft, an upper catch plate and a lower catch plate of the device in FIG. 1.
Figure 10:
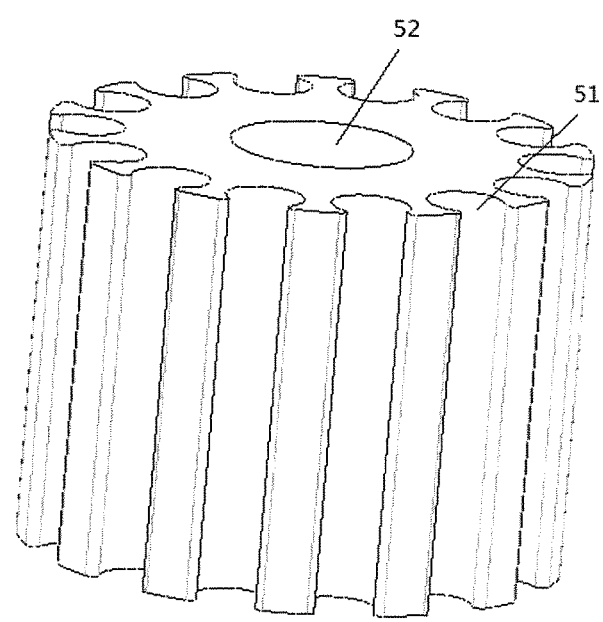
FIG. 10 is a perspective view showing an elastic sealing body of a device according to the invention.

Alternatively, as shown in FIGS. 1-2, the device 100 further includes an elastic sealing body 50. Referring to FIG. 9, the elastic sealing body 50 has an shaft receiving passageway 52 through which the shaft 10 passes and a plurality of third gripping slots 51 provided and equally spaced apart in a circumferential direction thereof, wherein each third griping slot 51 is opened radially outwards to receive the wire 200, and is in alignment with the corresponding first and second gripping slots 21, 31 in a direction parallel with the axial direction. The elastic sealing body 50 may be any holding member that can provide elastic deformation, for example, it may be made of sponge rubber, gel or the like. The elastic sealing body 50 may not only function to hold the wire 200, but also deform radially outwards when it is pressed in the axial direction (for example, as mentioned later, when it is pressed by the upper catch plate 20), the deforming, when the elastic sealing body 50 contacts with a barrier wall and thus the radially outward deformation is hindered, may provide a contact sealing with the barrier wall and/or gripping the wire 200 within the third gripping slot 51.

Alternatively, the size of the third gripping slot 51 at the opening thereof is reduced.

Figure 7:
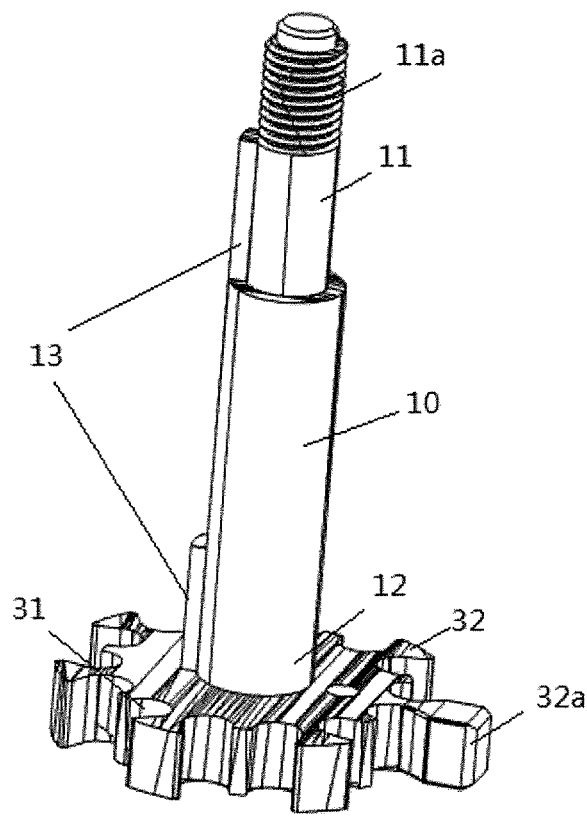
FIG. 7 is a perspective view showing a shaft and a lower catch plate of a device according to the invention.
Figure 8:
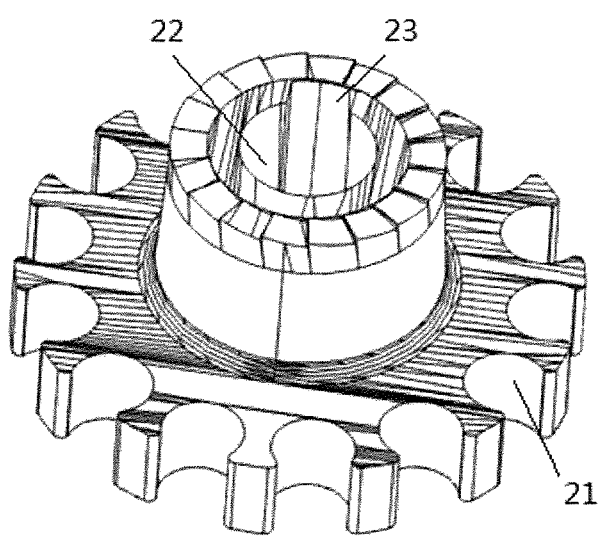
FIG. 8 is a perspective view showing an upper catch plate of a device according to the invention.
Figure 13:
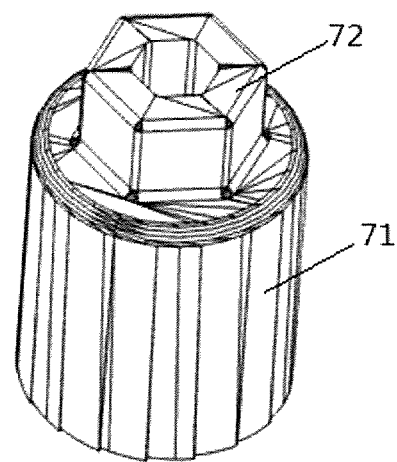
FIG. 13 is a perspective view showing a nut of a device according to the invention.

As shown in FIG. 8, the upper catch plate 20 is provided with an upper catch plate shaft receiving passageway 22 through which the shaft passes; and as shown in FIGS. 2, 4, 7 and 13, the upper end 11 of the shaft is provided with threads 11a and a nut 70 mating therewith, tightening operation of the nut 70 causing the elastic sealing body 50 to press the upper catch plate 20. Referring to FIG. 13, the nut 70 comprises a cylinder 71 and an operation part 72 provided above the cylinder 71 for rotating the cylinder, and inside the cylinder 71 are provided with internal threads mating with the threads at the upper end of the shaft, and in a top view, the external diameter of the cylinder is within a curve defined by internal edges of the first gripping slots 21 of the upper catch plate, in this way, the nut 70 will not interfere with the wires 200.

As shown in FIG. 7, an outer periphery surface of the shaft 10 is provided with a key bar 13 extending in an axial direction of the shaft, and as shown in FIG. 8, the upper catch plate shaft receiving passageway 22 is provided therein with an upper key receiving groove 23 mating with the key bar 13.

As shown in FIG. 2, the device 100 further include a fixing plate 60.

Figure 11:
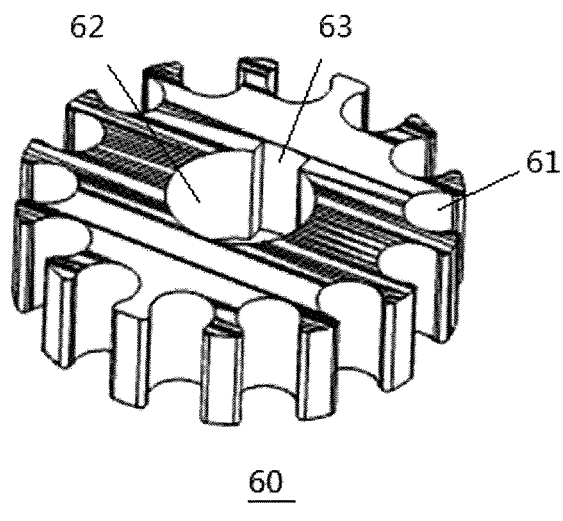
FIG. 11 is a perspective view showing a fixing plate of a device according to the invention.
Figure 12:
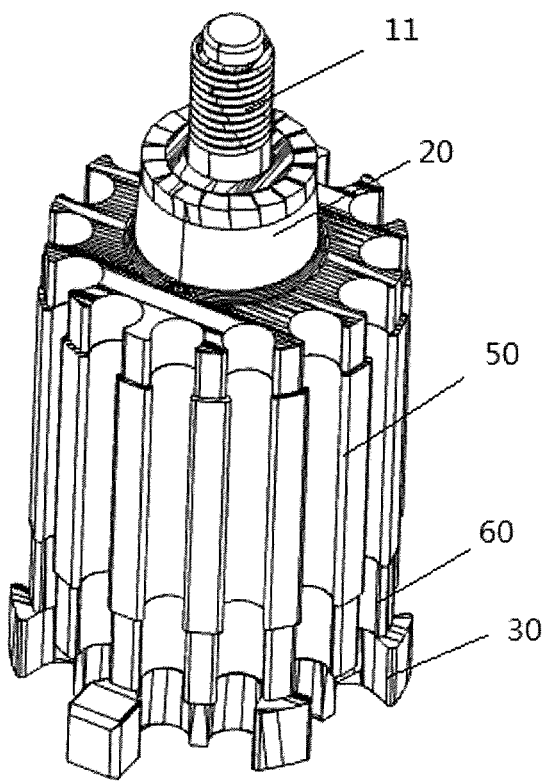
FIG. 12 is a perspective view showing a shaft, an upper catch plate, a lower catch plate, an elastic sealing body, and a fixing plate of a device according to the invention.

As shown in FIG. 11, the fixing plate 60 includes a shaft receiving passageway 62 and a plurality of fourth gripping slots 61. The shaft receiving passageway 62 receives the shaft 10. The plurality of fourth gripping slots 61 are equally spaced apart in a circumferential direction thereof, wherein each fourth gripping slot 61 is opened radially outwards and adapted to receive the wire 200. Each fourth gripping slot 61 is in alignment with corresponding first, second and third gripping slots 21, 31 and 51 in a direction parallel with the axial direction, and the fixing plate 60 is provided between the lower catch plate 30 and the elastic sealing body 50.

Alternatively, the shaft receiving passageway 62 is provided therein with a key groove 63 mating with the key bar 13. The fourth gripping slot 61 is designed similar to the first griping slot 21. Alternatively, the internal surface of the fourth gripping slot 61 is provided with transverse ribs perpendicular to the axial direction of the shaft 10, the transverse ribs may increase the force for resisting pulling the wire 200 out of the fourth gripping slot 61.

The internal surface of the second gripping slot 31 may be provided with transverse ribs perpendicular to the axial direction of the shaft 10.

As shown in FIG. 7, the lower catch plate 30 may be provided with 2n second gripping slots 31, wherein n is an integer not less than 3, and adjacent second gripping slots 31 are spaced apart by a rib, wherein n ribs extend radially outwards to form n wedges 32 respectively. The size of each wedge is increased in a radially outward direction, and two second gripping slots 31 are provided between any two adjacent wedges 32. Two inclined surfaces of the wedge 32 function to respectively reduce the size of the openings of the two adjacent second gripping slots 31. Alternatively, the radial inner side of the retention ring 40 is provided with a recess 41 in which the wedge 32 is received (refer to FIG. 4).

Figure 5:
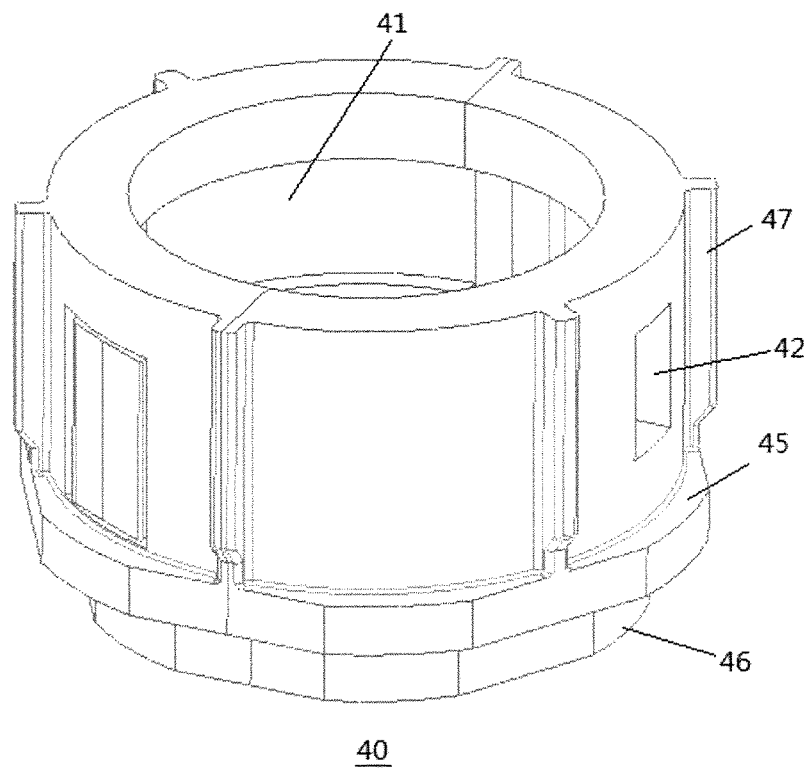
FIG. 5 is a perspective view showing a retention ring for a device according to the invention.
Figure 6:
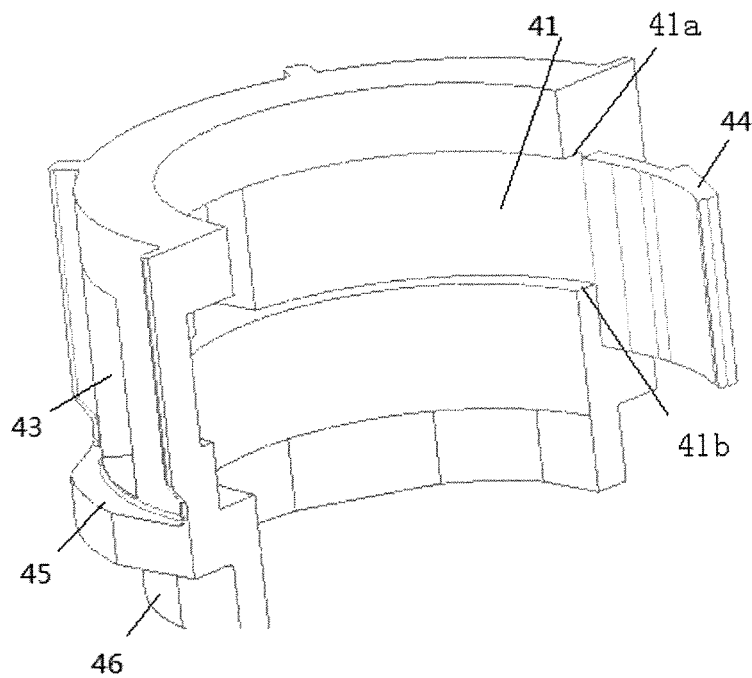
FIG. 6 is a perspective view showing a half of the retention ring in FIG. 5.

The retention ring 40 will be described next with reference to FIGS. 5 and 6. As shown in FIG. 5, the retention ring 40 has two halves which are removably connected together. The two halves may be connected together by using two snap-fit connections (as shown in FIGS. 5-6), or the two halves may be pivotally connected at first ends thereof and the second ends thereof are connected together by means of snap fit connector. Alternatively, the two halves may be connected together by using screws or other known fasteners. As shown in FIGS. 5 and 6, the two halves are of substantially the same structure, the first end of one half is provided with a hook receiving opening 43, and the second end of the one half is provided with an elastic hook 44 that is adapted to engage a hook receiving opening 43 of the second half. When the two halves in FIGS. 5 and 6 are pressed towards each other, the two elastic hooks 44 are engaged within the two hook receiving openings 43 respectively so as to connect the two halves together.

As shown in FIG. 5, one half of the retention ring 40 is provided in the recess 41 with one lug receiving space 42 extending radially through the retention ring, and one wedge 32 of n wedges is provided at an outer radial end thereof with a lug 32a (see FIG. 7) extending radially, and the lug 32a is adapted to be received in the corresponding lug receiving space 42 when the lower catch plate is wrapped by the retention ring (see FIG. 1). Two lugs 32a may be provided, and in this case, each half is provided with a lug receiving space 42. The engagement between the lug 32a and the lug receiving space 42 may prevent the lower catch plate 30 from rotating relative to the retention ring 40.

Alternatively, the lug 32a is not necessary. In this case, adjacent second gripping slots 31 are spaced apart by a rib, and a plurality of ribs extend radially outwards to form protrusions (corresponding to the wedges 32); the radial inner side of the retention ring 40 is provided with a recess 41 in which the protrusions are received.

With the engagement of the recess 41 and the wedges 32, the movement of the wedges 32 relative to the retention ring 40 in the axial direction is prevented by upper and lower walls of the recess 41, thus the movement of the lower catch plate 30 relative to the retention ring 40 in the axial direction is prevented.

As shown in FIGS. 5-6, the retention ring 40 further includes a protruding rib 45 extending in a circumferential direction thereof, and a connection piece 46 below the protruding rib. The periphery surface of the retention ring 40 may be provided with a plurality of longitudinal ribs 47.

Now, with reference to FIGS. 14 and 15, another device according to the invention for fixing a plurality of wires will be described.

Specifically, the upper catch plate 20 has a shaft receiving passageway through which the shaft 10 passes, thus, the upper catch plate 20 may move up and down along the shaft 10. The shaft 10 is hollow and a nut 35 is provided at a connection of the shaft 10 and the lower catch plate 30. The nut 35 may be provided in the lower catch plate 30, or at the upper or lower surface of the lower catch plate 30. The device further includes a bolt 90 with one end of that passes through the hollow shaft 10 and is in screw engagement with the nut 35. Another end of shaft 10 has an expanded portion 92 above the upper catch plate 20, wherein a bottom surface of the expanded portion 92 is against the upper catch plate 20 so that the expanded portion 92 presses the upper catch plate 20 downward with a screwing operation of the bolt within the nut. The upper catch plate 20 moves downwards due to the downward pressing, and thus presses the elastic sealing body 50 below the upper catch plate 20. In the shown embodiment, the fixing plate 60 is not necessary.

Figure 14:
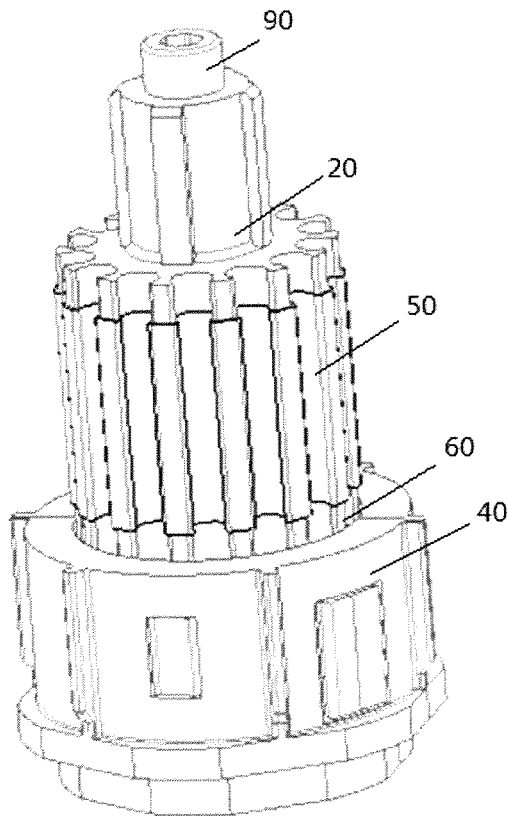
FIG. 14 is a perspective view showing a device according to the invention.
Figure 15:
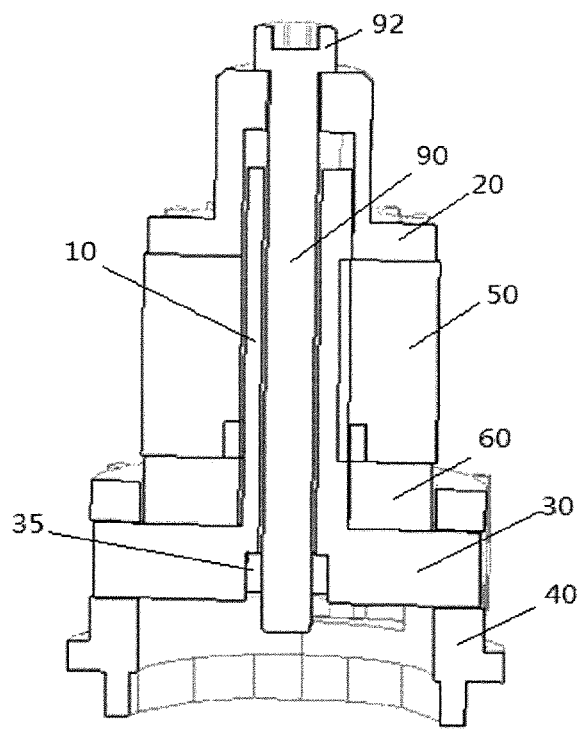
FIG. 15 is a sectional view of the device in FIG. 14.

In addition, except for the solution in which the upper catch plate 20 is driven to move downward so as to press the elastic sealing body 50, the device shown in FIGS. 14-15 is the same as the preceding device 100 for fixing a plurality of wires simultaneously.

Figure 16:
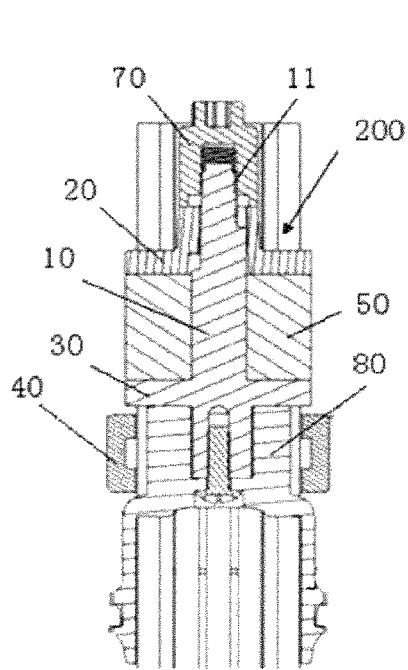
FIG. 16 is sectional perspective view showing a device according to the invention.
Figure 17:
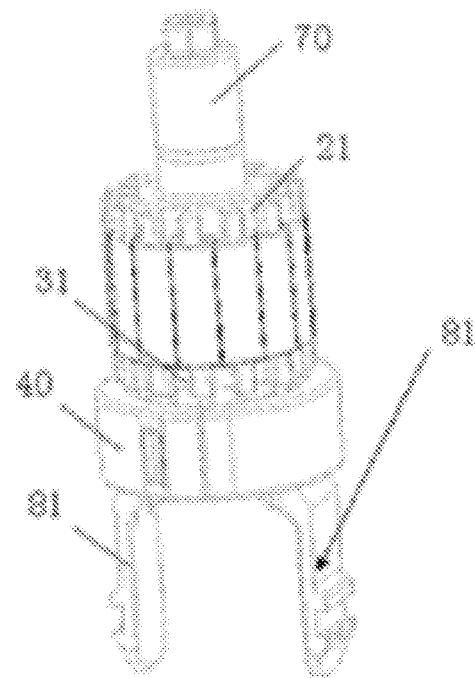
FIG. 17 is a perspective view showing the device in FIG. 16.

With reference to FIGS. 16 and 17, a device for according to the invention that is for fixing a plurality of wires will be described.

Specifically, an upper portion of the shaft 10 is provided with threads 11a and a nut 70 mating therewith. The upper catch plate 20 has a shaft receiving passageway through which the shaft 10 passes.

The device further includes an elastic body 50 and a lower fixing plate. The elastic sealing body 50 is provided between the upper and lower catch plates 20 and 30, an includes an shaft receiving passageway through which the shaft 10 passes and a plurality of third gripping slots (not shown, though they are similar to the first gripping slots 21) equally spaced apart in a circumferential direction thereof. Each third gripping slot is opened radially outwards to receive the wire 200 and is in alignment with corresponding first and second gripping slots 21, 31 in a direction parallel with the axial direction. The lower fixing plate 80 is positioned with a lower portion of the shaft 10 and includes a plurality of fourth gripping slots (not shown, similar to the first gripping slot 21) that are equally spaced apart in a circumferential direction thereof. Each fourth gripping slot is opened radially outwards and adapted to receive the wire 200. Each fourth gripping slot is in alignment with corresponding first, second and third gripping slots 21, 31, 51 in a direction parallel with the axial direction. The radial outer side of the lower fixing plate 80 is further provided with a gripping hook 81 extending downwards, and the retention ring 40 is provided to removably wrap the circumferential of the lower fixing plate 80.

Except for the mounting position of the retention ring 40 and the structure of the lower catch plate 30, the device for fixing a plurality of wires simultaneously shown in FIGS. 16-17 is the same as the preceding device for fixing a plurality of wires simultaneously.

With the solution of the invention, first, a plurality of wires 200 may be gripped in corresponding first and second gripping slots 21, 31 which are in alignment with each other in the axial direction so as to pre-locate the wires; and then the lower catch plate 30 is wrapped by the retention ring 40 to fix the wires 200 located within the second gripping slots 31.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A device comprising:
   a first catch plate having a plurality of first catch plate gripping slots spaced apart from each other and disposed about a circumference thereof, each of the plurality of first catch plate gripping slots having a wire receiving opening extending through a thickness of the first catch plate, the first catch plate being a lower catch plate;
   a second catch plate having a plurality of second catch plate gripping slots spaced apart from each other and disposed about a circumference thereof such that the plurality of second catch plate gripping slots correspond to the plurality of first catch plate gripping slots, the second catch plate being an upper catch plate;
   a shaft connecting the lower catch plate and the upper catch plate;
   an elastic sealing body positioned between the upper catch plate and the lower catch plate, the elastic sealing body including a receiving passageway through which the shaft passes and a plurality of sealing-body gripping slots disposed along a circumference thereof, each of the plurality of sealing-body gripping slots being in alignment with the plurality of first catch plate gripping slots and the plurality of second catch plate gripping slots;
   a fixing plate positioned between the lower catch plate and the elastic sealing body, the fixing plate having a shaft receiving passageway through which the shaft passes and a plurality of fixing plate gripping slots equally spaced apart and disposed along a circumference thereof, each of the plurality of fixing plate gripping slots being in alignment with and corresponding to the plurality of first gripping slots and the plurality of second gripping slots; and a retention ring removably secured to a periphery of the first catch plate.

2. The device according to claim 1, wherein the shaft includes a key bar extending along a length thereof.

3. The device according to claim 2, wherein the upper catch plate includes an upper key receiving groove mating with the key bar.

4. The device according to claim 1, wherein an internal surface of each of the plurality of fixing plate gripping slots includes a transverse rib extending perpendicularly therefrom.

5. The device according to claim 1, wherein adjacent pairs of the plurality of first catch plate gripping slots are spaced apart by a rib.

6. The device according to claim 5, wherein a number of the plurality of first catch plate gripping slots is equal to 2n, wherein n is an integer greater than or equal to 3.

7. The device according to claim 6, wherein some of the ribs extend radially outward to form n wedges such that two of the plurality of first catch plate gripping slots are disposed between each pair of adjacent n wedges.

8. The device according to claim 1, wherein the retention ring includes two halves that are detachably connected to each other.

9. The device according to claim 8, wherein the plurality of first catch plate gripping slots are spaced apart by a plurality of ribs that extend radially outwards to form protrusions.

10. The device according to claim 9, wherein the retention ring includes a recess in which one of the protrusions is received.

* * * * *